Feb. 22, 1949.  C. A. KOZA  2,462,647
ANGLE DRILL
Filed April 21, 1948
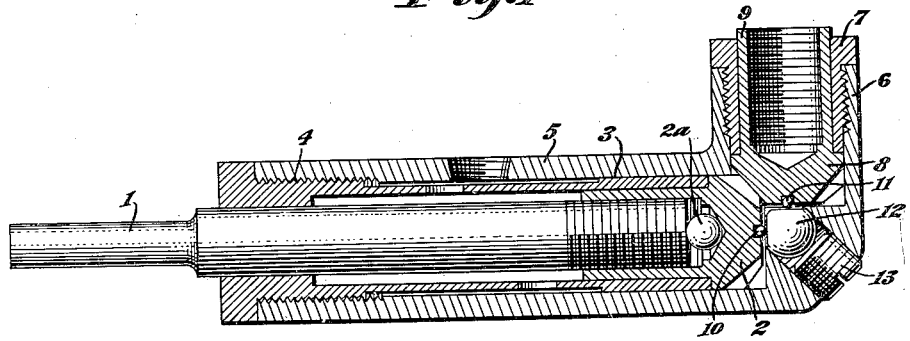
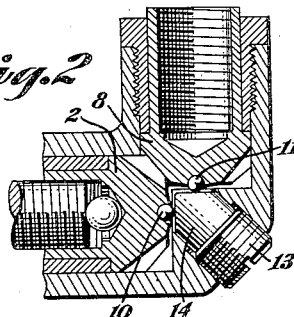
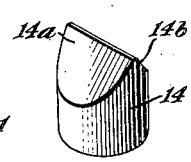
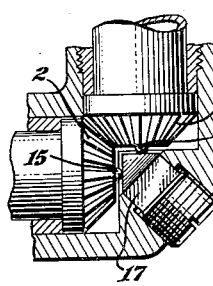
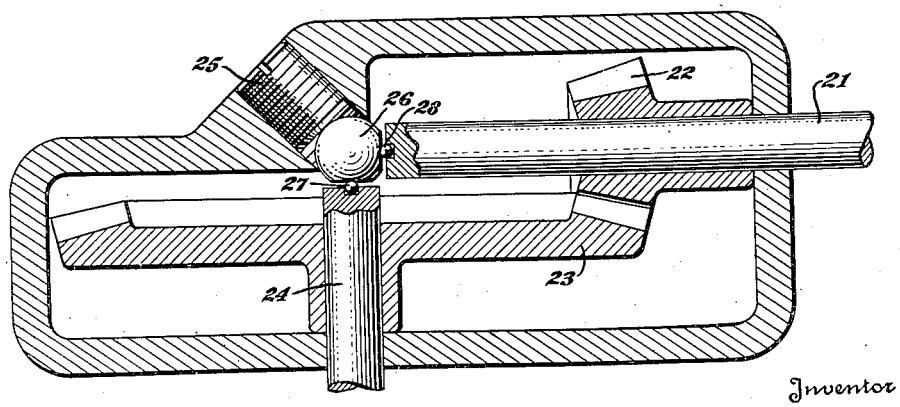
Inventor
CHARLES A. KOZA
ATTORNEY Patented Feb. 22, 1949

2,462,647

UNITED STATES PATENT OFFICE 2,462,647

ANGLE DRILL

Charles A. Koza, Pittsburgh, Pa.

Application April 21, 1948, Serial No. 22,361

6 Claims. (Cl. 74—416)

1

This invention relates to angle drives and, more particularly, to angle drives which are especially useful in angle drills commonly employed for drilling holes in restricted places at an angle to the driving shaft.

In my earlier Patent No. 2,229,509, issued January 21, 1941, on "Angle drill construction," of which the present application is an improvement, a single ball is provided at the juncture or apices of two meshing bevel gears, which ball is seated in the respective gears, therefore resists end thrust and is adjustable in position angularly to take up for wear of the relatively rotating parts. A disadvantage of such ball is that due to its relatively large size and large area of contact in the bevel gear seats, it does not freely rotate and often remains perfectly stationary, resulting in accelerated wear of the bevel gear seats causing crowding of the gears together, misalignment, and considerable wearing thereof which shortens the life of the drill.

An object of the present invention is to provide a novel angle drive of the adjustable type useful for an angle drill and which is devoid of the above mentioned disadvantages.

A more specific object of the present invention is to provide a novel angle drill including adjustable end-thrust anti-friction bearing means disposed between the meshing bevel gears and so constructed as to considerably reduce friction and heating of the parts during use and to maintain perfect alignment of the drilling spindle irrespective of wear of the parts.

Broadly stated, my invention relates to an angle drive particularly useful in angle drills, wherein two bevel or miter gears are in meshing relationship and two small ball bearings are provided, one seated in each face thereof and wherein an end thrust member having angularly disposed flat faces is adjustably positioned at the juncture or apices of the gears in a manner so that the small balls will roll freely on such flat faces of the common end thrust member, thereby permitting taking up for wear and for any tendency to get out of the proper angular alignment.

Other objects and advantages of this invention will become apparent from a study of the following specification taken with the accompanying drawings wherein:

Fig. 1 is a longitudinal cross sectional view of a right angle drill embodying my invention;

Fig. 2 is a fragmentary cross sectional view of a modified form of angular drive useful in the drill shown in Fig. 1;

Fig. 3 is a perspective view of the adjustable end thrust member shown in Fig. 2;

Fig. 4 is a fragmentary cross sectional view of a still further modified form of angular drive useful in the drill shown in Fig. 1, and Fig. 5 is a longitudinal cross sectional view of

2 a bevel gear drive of another type than in an angle drill.

Referring more particularly to Fig. 1, numeral 1 denotes a driving spindle which may be rotated by an electric motor, lathe or other suitable source of motive power (not shown) through any suitable driving means, such as a driving chuck (not shown). Rigidly fastened to driving spindle 1 is a bevel or miter gear 2 whose end thrust is taken up in one direction by a sleeve-like bearing 3 screw threaded at 4 into one end of the long tubular part of a housing 5. Ball 2a may be wedged between the end of shaft 1 and the interior of bevel gear 2 to prevent damaging of the end threads, or may be omitted, if desired. Into a short angular extension 6 of the housing there is screw threaded a bearing member 7 for taking up end thrust of the driven bevel gear 8 in one direction. The interior of the sleeve-like portion 9 of bevel gear 8 is screw threaded to enable fastening therein of an adapter or drill. The parts 8 and 9 form a driven spindle for accommodating a drill or other suitable driven member.

In accordance with the principles of the present invention, a small anti-friction ball 10 is seated in a suitable pocket formed in the face of driving bevel gear 2 and a small anti-friction ball 11 is correspondingly seated in the face of driven bevel gear 8. An anti-friction end thrust element 12 is provided at the juncture of the two bevel gears and may be in the form of a sphere having two flat, angularly disposed faces which are in contact with balls 10 and 11, respectively. These faces are shown as being disposed at an angle of 90°, but in case of a 45° drill, they would be disposed at an angle of 45°, etc. An adjusting screw 13 is screw threaded into a corner of housing 5 and abuts against member 12 so as to take up for wear. That is, by screwing in the adjusting screw 13, member 12 moves further inwardly causing rolling of balls 10 and 11 on its flat faces and separating the bevel gears, thereby preventing their crowding together, which otherwise would result in excessive wear.

The common adjustable member 12, therefore, serves to take up end thrust of both bevel gears 2 and 8 in one direction (toward the apices thereof). End thrust in the opposite directions, as stated hereinbefore, is taken up by the sleeve-like bearing members 3 and 7, respectively.

Inasmuch as only a point of contact is provided between the small balls 10 and 11 and the flat surfaces of member 12, very little friction will be developed, thereby considerably increasing the efficiency of the drive. Furthermore, since the small balls are free to roll on such flat surface, any tendency towards lateral or longitudinal displacement of the driving and driven spindles will be automatically compensated for without the development of excessive friction or wear. Also, since the flat surfaces are at a definite 90° angular relationship, they will tend to keep the faces of the bevel gears in exactly the same angular relationship, even after the parts wear appreciably. It is necessary to make only member 12 and the small balls 10 and 11 of hard material. With such arrangement, therefore, it is unnecessary to make the seats of the bevel gears of hard material as would be required in the construction shown in my aforesaid earlier patent.

Fig. 2 shows a modification of the angular drive and adjusting means shown in Fig. 1. The adjustable end thrust element 14 is in the form of a cylindrical element having two flat sides 14a and 14b which bear against the small balls 10 and 11, respectively, seated in the driving and driven bevel gears 2 and 8 respectively. Anti-friction balls 10 and 11 may be either loosely seated as shown in Fig. 1 or may be actually firmly embedded and stationarily mounted by spinning the surfaces of the bevel gears so as to provide material for solidly and rigidly embedding the respective balls in their seats. The adjusting screw 13 is the same as that shown in Fig. 1.

Fig. 4 shows a still further modification wherein instead of spinning small anti-friction balls in the faces of the bevel gears, integral protuberances 15 and 16 are formed on bevel gears 2 and 8, respectively. Also, the adjusting element 17 may be square in cross section (or polygonal) and have an end with either two opposite flat sides at an angle of 90° or four flat sides in the form of a pyramid for bearing contact with the nibs or protuberances 15 and 16.

Fig. 5 shows a still further modification wherein an angle drive is provided in a structure other than an angle drill. A driving shaft 21 has rigidly fastened thereto bevel gear 22 which meshes with a driven bevel gear 23 rigidly fastened to driven shaft 24. Adjusting screw 25 will move the common end thrust element 26 so that the flat faces thereof will be urged against small anti-friction balls 27 and 28, respectively, seated in the ends of the respective shafts 24 and 21.

It will be apparent that while I have shown various arrangements of the common end thrust adjustable element and various forms of anti-friction balls or means in the ends of the bevel gears, these are obviously readily interchangeable so that any adjusting element may be used with any design of anti-friction elements.

An important feature of my invention is that the angle drill has relatively few parts, which parts are simple and may be removed or replaced with only a pair of pliers and a screw driver.

Thus it will be seen that I have provided a relatively simple and efficient angle drill drive with an adjustable end thrust element common to both meshing bevel gears which is of such construction and arranged in such manner as to minimize wear and crowding of the gears and prevent excessive friction otherwise caused from slight misalignment of the respective shafts, also which drive has solely a point of contact with the common adjustable end thrust element so as to reduce the frictional heat developed and considerably increase the efficiency of the drive, thereby extending the life of the drill over a considerably longer period than that of conventional angle drills. While my novel adjustable angle drive is shown in an angle drill, it will be apparent that it is useful in other drives than drills, such as in machinery, that is, in drives wherein the driven member is at an angle with respect to the driving member.

While I have illustrated and described certain specific embodiments of my invention, it will be understood that these are by way of illustration only, and that various changes may be made within the specification and within the scope of the following claims.

I claim:

1. An angle drill comprising, in combination, a tubular housing having a tubular angular extension at one end thereof, a spindle rotatably mounted in said tubular housing, a second spindle rotatably mounted in said extension, a bevel gear extending from each of said spindles so as to mesh with each other at the juncture between said tubular housing and its extension, an anti-friction spherical surface provided on the adjoining faces of each of said gears, an adjusting screw threaded transversely into the juncture between said housing and its extension, and an end thrust element having angularly disposed faces held against said spherical surfaces by said adjusting screw.

2. An angle drill as recited in claim 1 wherein said end thrust element is in the form of an anti-friction ball having said angularly formed faces formed in one hemi-spherical portion thereof.

3. An angle drill as recited in claim 1 wherein said end thrust element is in the form of a cylinder having angularly disposed faces disposed at one end thereof.

4. An angle drill as recited in claim 1 wherein said end thrust member has a polygonal cross section and has angularly disposed end faces at one end thereof.

5. Apparatus recited in claim 1 wherein said anti-friction balls seated in the faces of the gears are rigidly held therein by metal spun from said faces in a manner so as to prevent rotation of said balls in their seats.

6. An angle drill comprising, in combination, a tubular housing having a tubular angular extension at one end thereof, a spindle rotatably mounted in said tubular housing, a second spindle rotatably mounted in said extension, a bevel gear extending from each of said spindles so as to mesh with each other at the juncture between said tubular housing and its extensions, an anti-friction protuberance integrally formed with and extending from the adjoining faces of each of said gears, an adjusting screw threaded transversely into the juncture between said housing and its extension, and an end thrust element having angularly disposed faces held against said protuberances by said adjusting screw.

CHARLES A. KOZA.

REFERENCES CITED

The following references are of record in the file of this patent:

UNITED STATES PATENTS

| Number | Name | Date |
| --- | --- | --- |
| 1,273,275 | Rosen et al. | July 23, 1918 |
| 2,147,832 | Drexler | Feb. 21, 1939 |
| 2,229,509 | Koza | Jan. 21, 1941 |
| 2,319,465 | Mecombs | May 18, 1943 |
| 2,438,291 | Koza | Mar. 23, 1948 |